United States Patent
Parvania et al.

(10) Patent No.: US 12,464,017 B2
(45) Date of Patent: Nov. 4, 2025

(54) SECURITY SYSTEMS, METHODS, STORAGE MEDIUM FOR INCREASING SECURITY OF DEVICES UTILIZING A COMMUNICATION CHANNEL

(71) Applicant: UNIVERSITY OF UTAH RESEARCH FOUNDATION, Salt Lake City, UT (US)

(72) Inventors: Masood Parvania, Salt Lake City, UT (US); Jairo Giraldo, Salt Lake City, UT (US); Alejandro Palomino, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 181 days.

(21) Appl. No.: 18/156,985

(22) Filed: Jan. 19, 2023

(65) Prior Publication Data

US 2024/0267407 A1 Aug. 8, 2024

(51) Int. Cl.
*H04L 9/40* (2022.01)
*G06F 16/27* (2019.01)
(Continued)

(52) U.S. Cl.
CPC .......... *H04L 63/1466* (2013.01); *G06F 16/27* (2019.01); *H04L 63/1416* (2013.01);
(Continued)

(58) Field of Classification Search
CPC . H04L 63/14; H04L 63/1416; H04L 63/1466; H04L 63/1475; H04L 63/1483;
(Continued)

(56) References Cited

U.S. PATENT DOCUMENTS

| | | | |
|---|---|---|---|
| 7,979,652 B1 * | 7/2011 | Sivasubramanian | ... G06F 16/27 711/141 |
| 10,613,779 B1 * | 4/2020 | Brooks | ............... G06F 11/0751 |

(Continued)

FOREIGN PATENT DOCUMENTS

| | | |
|---|---|---|
| CN | 112313915 B | 8/2021 |
| CN | 114519190 A | 5/2022 |

(Continued)

OTHER PUBLICATIONS

Giraldo, et al., "Decentralized Moving Target Defense for Microgrid Protection Against False-Data Injection Attacks", IEEE Transactions on Smart Grid, vol. 13, No. 5, Sep. 2022.

(Continued)

*Primary Examiner* — Shaqueal D Wade-Wright
(74) *Attorney, Agent, or Firm* — Workman Nydegger

(57) ABSTRACT

A security system for enhancing security of a device utilizing a communication channel includes one or more processors and a storage including instructions stored thereon. When the instructions are executed by the one or more processors, the instructions cause the security system to receive, by a plurality of Internet of Thing (IoT) devices, data from a communication source through a first communication channel, replicate, by the plurality of IoT devices, the received data, randomly activate one of non-empty subsets of the plurality of IoT devices, select a majority vote input based on the replicated data from the randomly activated subset of the plurality of IoT devices; and transmit the majority vote input to a communication destination through a second communication channel, which is different from the first communication channel.

20 Claims, 10 Drawing Sheets

(51) Int. Cl.
*G06F 21/55* (2013.01)
*G16Y 30/10* (2020.01)
*H04W 12/122* (2021.01)

(52) U.S. Cl.
CPC ............ H04L 63/18 (2013.01); *G06F 21/556* (2013.01); *G16Y 30/10* (2020.01); *H04L 63/1475* (2013.01); *H04L 63/1483* (2013.01); *H04W 12/122* (2021.01)

(58) Field of Classification Search
CPC .... H04L 63/18; H04W 12/12; H04W 12/122; H04W 12/125; G06F 16/27; G06F 21/50; G06F 21/55; G06F 21/554; G06F 21/556; G16Y 30/10
See application file for complete search history.

(56) References Cited

U.S. PATENT DOCUMENTS

| | | | |
|---|---|---|---|
| 11,075,934 | B1 | 7/2021 | Aldhaheri et al. |
| 11,381,582 | B1 | 7/2022 | Mohammed et al. |
| 2016/0028806 | A1* | 1/2016 | Wareing .............. H04L 67/1095 709/217 |
| 2017/0264493 | A1* | 9/2017 | Cencini ................... H04L 67/12 |
| 2018/0276261 | A1 | 9/2018 | Smart |
| 2018/0309779 | A1 | 10/2018 | Benyo et al. |
| 2018/0316651 | A1* | 11/2018 | Yang ................... H04W 12/122 |
| 2019/0036887 | A1* | 1/2019 | Miller ...................... G07C 9/20 |
| 2019/0113549 | A1* | 4/2019 | Nakayama ........... G01R 22/066 |
| 2020/0195682 | A1* | 6/2020 | Chervoni .................. H04L 9/50 |
| 2022/0021710 | A1 | 1/2022 | Eskridge et al. |
| 2022/0358118 | A1* | 11/2022 | Paluch .................... H04L 41/30 |
| 2022/0391712 | A1* | 12/2022 | Karri ...................... G16Y 10/75 |

FOREIGN PATENT DOCUMENTS

| | | |
|---|---|---|
| CN | 109313687 B | 6/2022 |
| JP | 2022-522630 A | 4/2022 |
| WO | 2017/116525 A2 | 6/2017 |

OTHER PUBLICATIONS

Giraldo, et al., "Moving Target Defense for Cyber-Physical Systems Using IoT-Enabled Data Replication", IEEE Internet of Things Journal, vol. 9, No. 15, Aug. 1, 2022.

Palomino, "Cyber-Secure Utilization of Electric Vehicle Charging Flexibility in Distribution Networks", Department of Engineering, The University of Utah, Aug. 2022.

Palomino, et al., "Graph-Based Interdependent Cyber-Physical Risk Analysis of Power Distribution Networks", Aug. 2022.

Palomino, et al., "Majority Vote Moving Target Defense for Securing Electric Vehicle Charging Infrastructure", Aug. 2022.

* cited by examiner

SECURITY SYSTEMS, METHODS, STORAGE MEDIUM FOR INCREASING SECURITY OF DEVICES UTILIZING A COMMUNICATION CHANNEL

GOVERNMENT RIGHTS

This invention was made with government support under grant N00014-18-1-2395 awarded by the Navy/Office of Naval Research. The government has certain rights in this invention.

FIELD

This disclosure relates to security systems, security methods, and storage media generally for increasing security of devices, and more particularly for increasing security of devices utilizing a communication channel by adding layers of random replica activation and majority vote input to the communication channel.

BACKGROUND

Advances in automation and control of power microgrids rely on information and communication technologies (ICT), which increases vulnerability to cyber-attacks that aim to disrupt power system operation. The vulnerabilities have become more evident recently where several cyber-attacks have been reported on power systems. For instance, a synchronized and coordinated cyberattack compromised three Ukrainian regional electric power distribution companies, resulting in power outages affecting approximately 225,000 customers for several hours. Similarly, a denial-of-service (DOS) attack left grid operators temporarily blinded to power generation sites of several wind and solar farms in the U.S. One of the key factors to the success of such cyber-attacks is the static nature of the modern computing systems that allow adversaries to conduct reconnaissance on the system, learn vulnerabilities, and launch high-impact cyber-attacks.

FIG. 8 illustrates plots of datasets demonstrating how total attack potential against a power distribution system, measured as load, changed in December 2019. A plot 810 represents the weekly average for coincident electric vehicle charging load and a plot 820 represents the absolute peak coincident load for the coincident electric vehicle load at a 5-minute frequency. The plot 810 hovers between 50 kW and 70 kW, while the absolute peak coincident load, represented by the plot 820, is about three times greater than the weekly average. Hence, when an attacker is capable of accurately anticipating the peak load of the electric vehicle charging infrastructure, the attacker can significantly compromise the EV power distribution system and consequently increase the impact of attacks. There exists a broad range of spatio-temporal electric vehicle charging vulnerabilities from which adversarial reconnaissance can severely increase the impact of a cyber-security attack.

Moving Target Defense (MTD) is as a security measure designed to impose controlled shifts and changes across multiple system dimensions that introduce a dynamic and constantly evolving attack surface, to increase uncertainty, apparent system complexity, and costs for attackers. MTD was originally developed for computer network security, and several recent efforts have extended its application into the protection of power networks and other cyber-physical systems (CPSs), which include EV power distribution systems.

Further, several works have analyzed the effects of false-data injection (FDI) attacks in power grids and have proposed detection strategies. For instance, centralized and decentralized attack detection strategies have been introduced using a type of detection filter that is capable of detecting a variety of attack scenarios. Similarly, a real-time reference monitor has been proposed to detect cyber-attacks in power distribution networks that include nonlinear characteristics. The impact of FDI attacks and potential defense strategies have been analyzed on the electricity market. The FDI attack that intends to destabilize frequency regulation generally compromises a subset of frequency control data and injects optimal switching attacks. Anomaly detection and localization strategies use deep neural networks to differentiate between faults and cyber-attacks, and simultaneously find the location of the affected line or device in the power distribution system.

Many of the existing CPS MTD approaches focus on preventing sophisticated attack vectors at the cost of adding perturbations (e.g., admittances and/or voltages), which result in system performance degradation. In smart grids, most MTD approaches for state estimation require the installation of expensive distributed flexible AC transmission system devices, which in turn increase investment costs. On the other hand, most other attack detection strategies for power systems require state estimation or reference models to discern the presence of manipulated information. Decentralized attack detection approaches need to exchange information among neighbors, thereby increasing the communication network complexity. Hence, defense approaches, which are scalable, flexible, and low cost, and which do not degrade system performance, are needed to enhance the security and detectability of FDI attacks. Hence, there are opportunities to improve the cyber-security of modern, dynamic computing systems present in electric vehicle charging infrastructure, power systems, and CPSs.

BRIEF SUMMARY

Disclosed embodiments include security systems, methods, apparatuses, and storage media for increasing security for devices utilizing communication channels with moving target defense (MTD). By adding two layers to the MTD, cyber-attacks including false data injections can be substantially mitigated, thereby increasing the security of the system at large and communication channels therein.

This summary is provided to introduce a selection of concepts in a simplified form that are further described below in the Detailed Description. Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

In accordance with embodiments of the present disclosure, a security system, which enhances security of a device utilizing a communication channel, is disclosed. The security system includes one or more processors and a storage including instructions stored thereon. When the instructions are executed by the one or more processors, the instructions cause the security system to receive, by a plurality of Internet of Things (IoT) devices, data from a communication source through a first communication channel, replicate, by the plurality of IoT devices, the received data, randomly activate one of non-empty subsets of the plurality of IoT devices, select a majority vote input based on the replicated data from the randomly activated subset of the plurality of IoT devices, and transmit the majority vote input to a communication destination through a second communication channel, which is different from the first communication channel.

In accordance with embodiments of the present disclosure, a security method, which enhances security of a device utilizing a communication channel, is disclosed. The security method includes receiving, by a plurality of Internet of Thing (IoT) devices, data from a communication source through a first communication channel, replicating, by the plurality of IoT devices, the received data, randomly activating one of non-empty subsets of the plurality of IoT devices, selecting a majority vote input based on the replicated data from the randomly activated subset of the plurality of IoT devices, and transmitting the majority vote input to a communication destination through a second communication channel, which is different from the first communication channel.

In accordance with embodiments of the present disclosure, a computer-readable storage is disclosed and includes instruction that, when executed by a processor, cause the processor to perform a security method for enhancing security of a device utilizing a communication channel. The security method includes receiving, by a plurality of Internet of Thing (IoT) devices, data from a communication source through a first communication channel, replicating, by the plurality of IoT devices, the received data, randomly activating one of non-empty subsets of the plurality of IoT devices, selecting a majority vote input based on the replicated data from the randomly activated subset of the plurality of IoT devices, and transmitting the majority vote input to a communication destination through a second communication channel, which is different from the first communication channel.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings described below.

DETAILED DESCRIPTION

Disclosed embodiments include security systems, methods, and apparatuses for decentralized MTD with two additional layers of uncertainty to increase the security in electric vehicle (EV) charging infrastructure. The two layers of uncertainty are a random replica activation (RRA) layer and a majority vote input (MVI) layer for reduction of attack impact. The RRA layer and the MVI layer limit the success of attacks including false-data injections. This framework or majority vote input moving target defense via data replication (hereinafter "MVMTDR") may exploit the scalability and low cost of Internet of Things (IoT) devices to replicate sensory and control data, and one group of the replicated data may be randomly selected. The MVI in the randomly selected group is transmitted to a destination. The MVMTDR framework does not deteriorate the system performance in normal operations under attacks but is able to minimize the effects from the malicious data by only using local information without requiring the computation of any estimation model. Further, the MVMTDR framework limits stealthy attackers' reconnaissance over the EV charging infrastructure. Thereby, security can be improved in the EV charging infrastructure.

Figure 1:
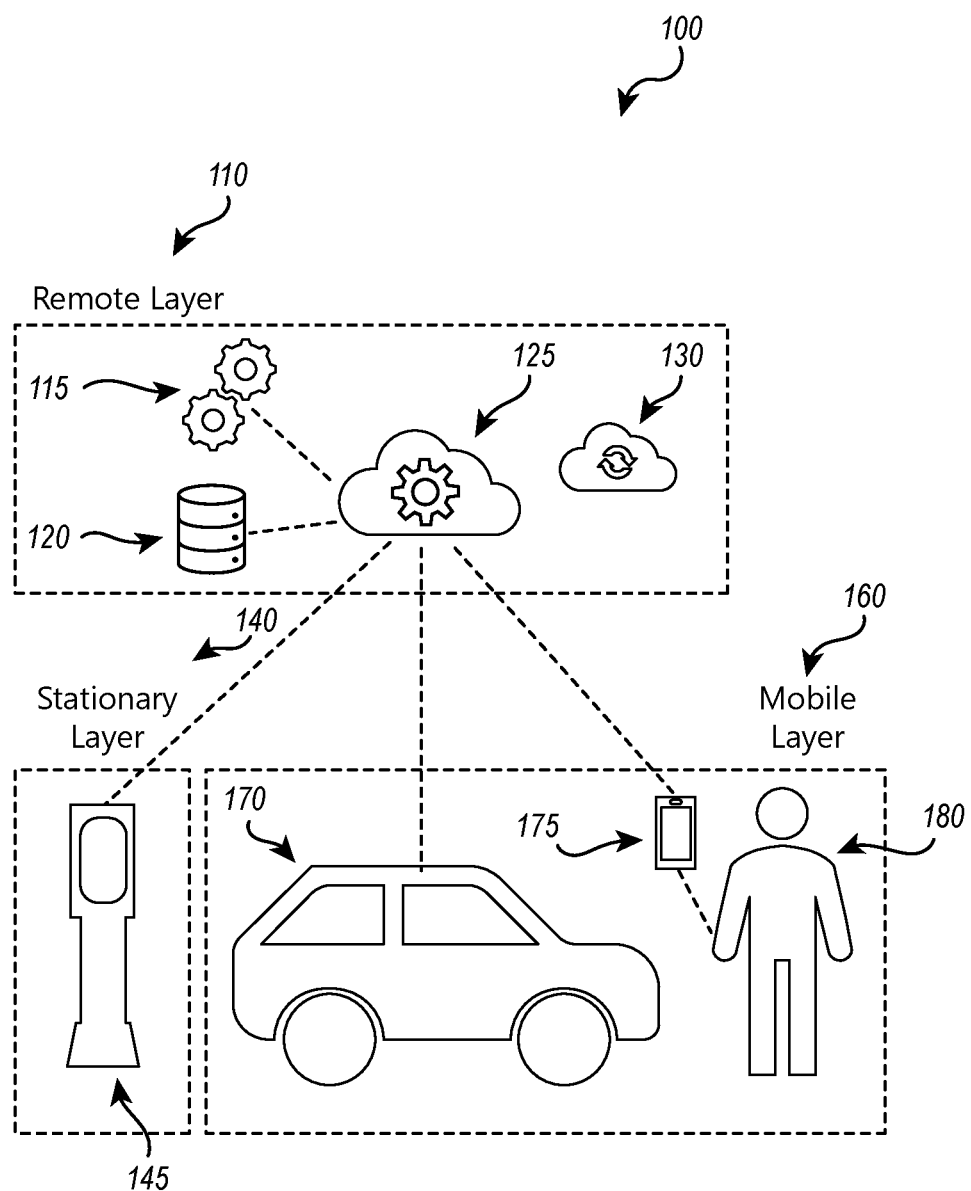
FIG. 1 depicts a graphical illustration of communication infrastructure for charging electrical vehicles in accordance with embodiments of the present disclosure.

With reference to FIG. 1, electric vehicle (EV) communication infrastructure 100 is illustrated for charging electrical vehicles 170 in accordance with embodiments of the present disclosure. The EV communication infrastructure 100 may include three layers. The first one is a remote layer 110 as a controller, the second one is a stationary layer 140, and the third layer 160 is a mobile layer 160. The remote layer 110 may include an optimization engine 115, a data storage 120, a data broker application programming interface (API) 125, and an external data API 130. The remote layer 110 may works as a controller for sending and receiving control data and sensory data to and from the stationary layer 140 and sending and receiving information data to and from the mobile layer 160. In an aspect, the EV communication infrastructure 100 is not limited to charging EVs but may be any infrastructure related to power grids which charges, generates, and/or distributes power. In another aspect, the EV communication infrastructure 100 may include any communication systems, in which on communication device sends and receives control data and sensory data to and from another communication device.

The optimization engine 115 may optimize regulation services in the EV communication infrastructure 100 based on frequency regulations, and the data storage 120 may store any data related to control, payment processing, user information, communication protocols, and interface protocols that are required to dispatch EV charging flexibility.

Through the external data API 130, the remote layer 110 may be able to communicate with third parties including grid operators, market operators, EV manufacturers, EV supply equipment (EVSE) manufacturers, building energy management systems, and the likes.

The stationary layer 140 may include EV charging stations or EVSEs 145, which generally positioned at one position and provide power charging service. Through the data broker API 125, the stationary layer 140 may send and receive instructions and information related to any input and session controls to and from the remote layer 110. The EVSE 145 may charge or re-charge EVs through a charging port (which is not shown). In an aspect, the EVSE 145 may be any energy storage device (e.g., batteries), power generating devices whether renewable (e.g., solar voltaic generators, wind turbine generators, or tidal generators) or non-renewable (e.g., diesel, coal, or nuclear power plants).

The mobile layer 160 may include EVs 170 and smart devices 175 of drivers 180. Through the data broker API 125, the EVs 170 may send and receive EV information (e.g., its model number, history of charging and discharging, firmware, etc.) and session control to and from the remote layer 110, and the smart devices 175 of the drivers 180 may send and receive the driver information, payment information, and the EV information (e.g., charging, discharging, mileage, etc.). Further, the EVs 170 may communicate with the smart devices 175 to update information of the EVs 170. In an aspect, the mobile layer 160 is not limited to the EVs 170 and the smart devices 175 but may include any power consumption devices (e.g., electric bike, train, airplane, etc.) and power consumption entities (e.g., industries, residentials, and the likes).

These physical couplings between the EVs 170 the EVSEs 145, through charging sessions, serve the primary function of electrified transportation. Hereinafter, plural forms of the elements of the EV communication infrastructure 100 may be used to represent the corresponding collective elements and singular forms may be used to represent the corresponding individual element. For example, the EV 170 may represent an individual EV, while the EVs 170 may represent two or more EVs.

As the drivers 180 drive the EVs 170 throughout the transit system and select EV charging stations 145 for charging and recharging, they establish many-to-many connections/relationships with the EVSEs 145 that vary in space and time. Beyond the power distribution system (PDS), charging relationships established among the EVSEs 145 and the EVs 170 interact with the remote layer 110 via cellular, wireless, or wired networks with mobile applications and vehicle telematics. These information and communication technology (ICT) layer interfaces are to support the safe, interdependent operation of EV charging within PDS operations. However, coordinated EV charging attacks can occur and cause voltage instability, under voltage conditions and harmonic distortions during the PDS operations. If a remote interface (e.g., the data broker API 125, the external data API 130, or physical connection between the EVSE 145 and the EV 170) is compromised, the operation to the same model or firmware version in the EVSEs 145 or EVs 170 can be vulnerable.

Since EV, financial, personal, and charging information can be communicated between the EVSEs 145 and the EVs 170 based on the direct connections, the EVSEs 145 may hold valuable financial, personal, and charging information and critical operation-related information. Due to this richness of personal, financial, and operational data on which the EVSEs 145 may rely for charging, the EVSEs 145 become valuable and critical targets for attacks. Their physical accessibility and underdeveloped cyber-physical security practices make them vulnerable to sophisticated adversaries. In particular, network EVSE interfaces, such as internet-based connections that extend maintenance and monitoring and control access, pose the most scalable threats to safe, reliable EV charging and PDS operation. Coordinated EV charging attacks, where the EVs 170 charge or discharge maliciously, can cause voltage instability, under voltage conditions, and harmonic distortions. If one of the interfaces is compromised, the operation of all downstream EVSEs of the same model or firmware version may be vulnerable in the presence of cyber-attacks.

Typical interfaces of the EVSE 145 include local web services, on-site network connections, and cloud backend APIs. The EVSEs 145 may host a local, wireless web service to ease on-site technician maintenance or enable mobile application control by an operator. Unauthorized network access on these services permit adversaries a system level access to maliciously control EVSE operations. On-site network connections include building energy management integration and site-specific control platforms. The Open Charge Point Protocol (OCPP) is the most prominent communication protocol for the EVSEs 145, host facilities, and intelligent charge management system (ICMS) platforms, but is vulnerable to man-in-the-middle (MitM) attacks.

Further, the mobility of the EVs 170 through the transit system and power infrastructure makes them valuable targets to distribute malware and increase the scope of a single attack. The EVs 170 and their supporting technologies establish many-to-many connections with the EVSEs 145, wireless interfaces, and transportation infrastructure. Thus, the threat landscape for the EVs 170 is dynamic. Network intrusion threats pose broad EVs risk and scalable impacts to the PDS operations through the manipulation of charging commands, vehicle states, or user credentials. APIs (e.g., the data broker API 125 and the external data API 130), thought which the EVs 170 are connected to EV manufacturers, ICMS operators, and drivers, expand the landscape of the threats.

Vulnerabilities in EV APIs may concern the PDS, because OEMs and 3rd parties rely on these remote interfaces to execute intelligent charging strategies. Manufacturers issue over-the-air (OTA) firmware and software updates to the EVs 170 to patch bugs or add features, but existing OTA technologies are often unsigned, unencrypted, and vulnerable to MitM attacks. Due to these vulnerabilities, the EVs 170 can become vectors for malware spread. Attackers could compromise vulnerabilities in a single EV 170 and allow the many-to-many interactions by the single EV 170 to spread malware to a critical number of the EVSEs 145 and then initiate a coordinated EV charging attack to disrupt the PDS.

Mathematical models for the EV charging and attacks are provided for explanation purposes only, are not meant to limit the scope of this disclosure to the provided mathematical models, and may include other models as persons having skill in the art would readily appreciate. In this modeling, it is assumed that a charging station or the EVSE 145 follows frequency regulation, and that an intelligent charging management system (ICMS) communicates directly with the EVs 170 to control charging via each EV's onboard telematics dashboard.

The frequency regulation is a service that is provided by loads and generators to support the power grid. For example, when the EV 170 is charged during a daytime, the price is generally higher than the price when charged during the nighttime. Likewise, the frequency regulation is to dynamically control the EVSEs 145 so that power can be distributed without overloads to the power grid and that the drivers 180 or the EVSE operators receives benefits (e.g., discounted charges for the charging).

To satisfy the EV's energy request and range needs and to have the EVSE charging power output following external regulation data, the ICMS needs to know the charging session start time $t_{start}$, disconnect time $t_{end}$, current state of energy (SOE) Q(t), requested state of energy $\hat{Q}(t_{end})$, and the maximum charging power $\overline{P}$ available from the EVSE. The following model for the EV charging is made with "m" number of EVs, and the number "m" may be an arbitrary natural number and is less than or equal to the maximum number of EVs that the EVSE 145 may be capable of charging at one moment. x represents the current state of energy (SOE) of the EVSE and can be expressed as $x=[Q_0, Q_1, \ldots, Q_m]^T$, where $Q_i$ represents the current SOE of the EVSE for the $i^{th}$ EV and the superscript "T" represents "transpose" as a matrix operation.

u represents control inputs (e.g., charging power delivered by the EVSE to each EV) to the EVs, as $u=[P_0, P_1, \ldots, P_m]^T$, where $P_i$ represents the charging power to the $i^{th}$ EV. Then, the state-space control model may be described as:

$$x(t+1) = Ax(t) + Bu(t), \text{ and} \quad (1)$$

$$y(t) = Cu(t), \quad (2)$$

where A is an identity matrix, B represents a temporal conversion from charging power delivered to energy transferred per timestep, (' is an identity vector which sums the total charging input power from each EV, y(t) represents the total power response from the charging m EVs.

A simple proportional and integral (PI) feedback coupled with discrete EV charging rules may be implemented in the model to achieve the dual objectives of the ICMS. In an aspect, a proportional, integral, and derivative (PID) control may be also implemented based on requirements in the PDS operations. In another aspect, any closed loop feedback controls or open loop feedback controls may be implemented based on requirements in the PDS operations as persons having skill in the art would appreciate.

Control may be executed in two phases. In the first phase, the ICMS may issue EV charging commands in concert with the reference load profile $\hat{y}(t)$ and the secondary objective of the controller. In the second phase, the ICMS may issue EV charging commands to ensure that the EV SOE Q(t) reaches the desired energy $\hat{Q}_i(t_{end})$ according to the requirements of the primary objective for the $i^{th}$ EV. In this second phase, the EV may be in a forced-charging state. The initiation of the forced-charging state and transition from the first phase to the second phase control occur at the transition time, $t^*_i$:

$$t^*_i = t_{i,end} - \frac{(\hat{Q}_i(t_{end}) - Q_i(t))}{\overline{Q}_{\Delta t}}, \quad (3)$$

where $t_{i,end}$ represents the disconnect time for charging the $i^{th}$ EV, $\overline{Q}_{\Delta t}$ represents the maximum amount energy that the EVSE can transfer to the $i^{th}$ EV in a unit time duration, $\Delta t$, and $Q_i(t)$ represents the current state of energy at the $i^{th}$ EV. This transition time $t^*_i$ defines when the $i^{th}$ EV needs to begin non-stop charging, ignoring the reference load profile $\hat{y}(t)$ or reference regulation data to reach its desired SOE $\hat{Q}_i(t_{end})$. Thus, this two-step control may be performed in a piecewise function u(t) including the PI feedback controller and the forced-charging state as:

$$u(t) = \begin{cases} K_P(\hat{y}(t) - y(t)) + K_I v(t), & t < t^* \\ \overline{P}, & t \geq t^*, \\ 0, & t \notin [t_{start}, t_{end}] \end{cases} \quad (4)$$

where $\hat{y}(t)-y(t)$ represents an error from the reference load profile $\hat{y}(t)$ or the reference regulation data, v(t) represent the cumulative error and is affected according to $v(t+1)=v(t)+(\hat{y}(t)-y(t))$, and $K_p$ and $K_I$ are proportional and integral gains, respectively. As defined in equation (4), the EVSE provides the maximum power $\overline{P}$ to the EV after the transition time t* regardless of the reference load profile $\hat{y}(t)$. Before the transition time t*, the EVSE used the PI feedback control to provide power to the EV. Outside of the charging period from $t_{start}$ to $t_{end}$, the EVSE does not provide any power to the EV.

Now turning to attacks, highly sophisticated and motivated attackers seek to disrupt the frequency regulation service provided by the EV charging infrastructure. The attackers aim to disrupt operation by (i) learning the typical peak load periods via eavesdropping the regulation data after performing reconnaissance over the EV charging infrastructure, (ii) issuing FDI attacks to oppose frequency regulation, and (iii) degrading EV charging performance reliability.

Assume a scenario in which the attacker drives to the EVSE host facility responsible for charging the EVs and surreptitiously connects to the facility's guest network from the parking lot and sniffs network traffic. Such an attack can be achieved by a man-in-the-middle compromise of the host facility network. The host facility monitors and controls EVSEs with an outdated implementation of OCPP (e.g., OCPP version 1.6) which lacks server/client certificates and message encryption. The attacker, impersonating an OCPP charging point (CP), or EVSE, then initializes a connection with the OCPP central system (CS). The attacker reads the nonce value of a legitimate CP on the network, as OCPP 1.6 messages are communicated in plain text, and impersonates the legitimate CP to the CS. Once the attacker is authenticated by the CS, the CS issues a session key which the attacker can relay to the impersonated CP to legitimate the authenticity of its action as a CS. In this way, the attacker has installed himself as a man-in-the-middle capable of disclosing, distorting, or disrupting information transacted between the CS and CP. This compromise enables the attackers an access to eavesdrop ICMS sensor data, to conduct reconnaissance in a reconnaissance phase, and inject false data command data to disrupt operation in an execution phase. The attacker considered disrupting the facility's participation in an EV charging-based frequency regulation program in these two phases.

In the reconnaissance phase, the attacker attempts to learn and predict the facility's peak EV load periods to ensure the attacker can launch his attack when it is most disruptive or when the EV charging power reaches its peaks. In the execution phase, the attacker initiates an FDI attack against individual EV charging sessions to disrupt frequency regulation participation and, while doing so, degrade EV range reliability for participating drivers. The attacker designs a disruptive, opposition data w(t) where the FDI commands issued totally oppose the target frequency regulation data, for example, namely $w(t)=-\hat{y}(t)$. The inclusion of this FDI attack into the controller in equation (4) above leads to, by simply replacing the reference regulation data ŷ(t) with the opposition data w(t):

$$u^a(t) = \begin{cases} K_P(w(t) - y(t)) + K_P v(t), & t < t^* \\ \overline{P} & t \geq t^*, \\ 0, & t \notin [t_{start}, t_{end}] \end{cases} \quad (5)$$

where $u^a(t)$ is the attacked controller, and the cumulative error v(t) is affected according to v(t+1)=v(t)+(w(t)−y(t)). The inclusion of this oppositional FDI attack disrupts the performance of the primary objective, as measured by the EVSE's SOE x(t), and the secondary objective, according to the EVSE's total power profile y(t) relative to the reference regulation data ŷ(t).

Figure 2:
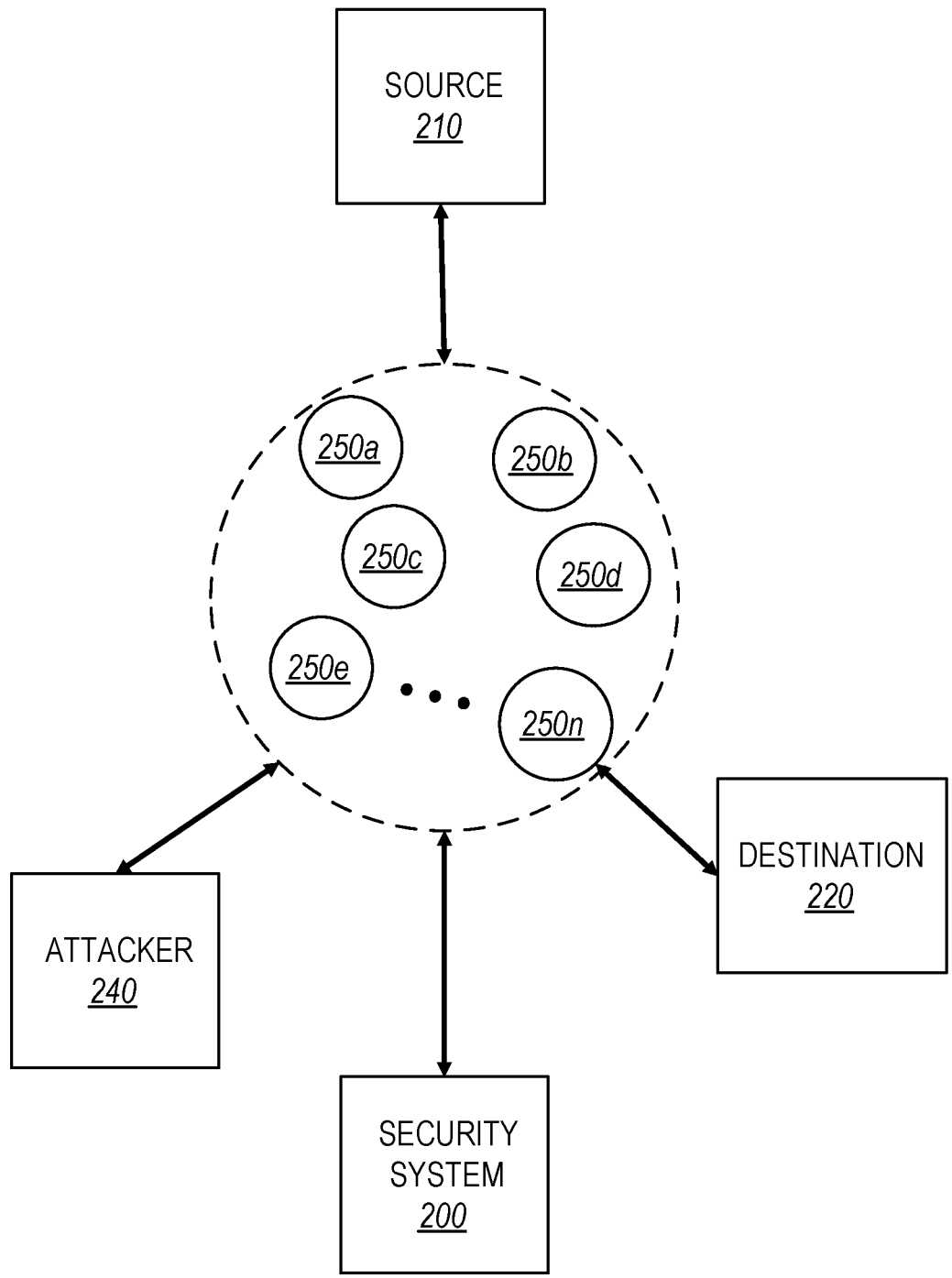
FIG. 2 depicts a block diagram of a security system in a communication interface in accordance with embodiments of the present disclosure.
Figure 3:
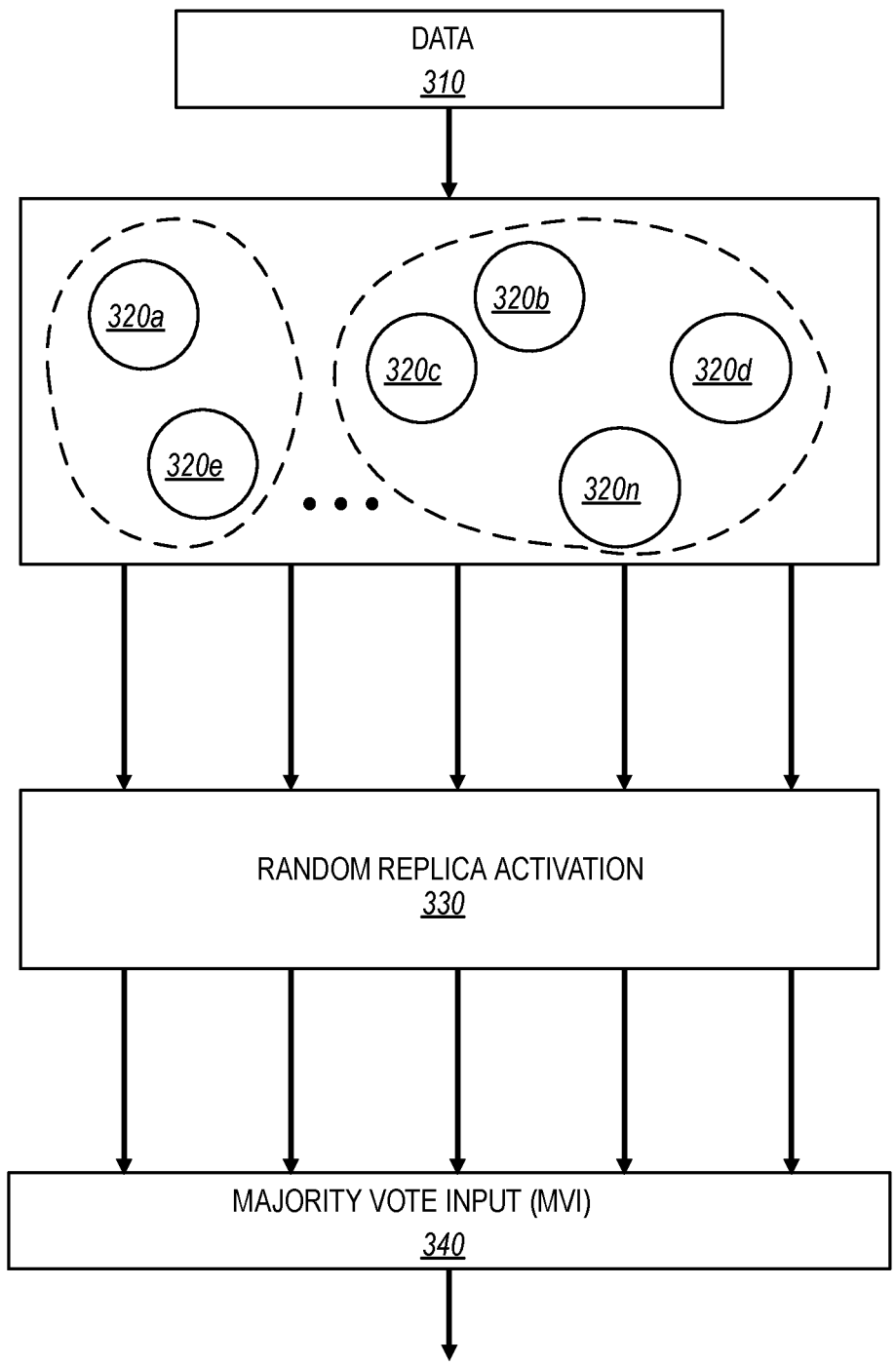
FIG. 3 depicts a block diagram of a security system utilizing additional layers to a moving target defense strategy according to embodiments of the present disclosure.

To prevent these vulnerabilities and impacts from attacks, disclosed is a security system 200 by utilizing Internet of Things (IoT) devices 250a-250n in the communication interface as illustrated in FIGS. 2 and 3 according to embodiments of the present disclosure. When a communication source 210 intends to transmit control or sensory data to a communication destination 220, an attacker 240 may eavesdrop and intercept the data and maliciously add false data to the data so that the communication destination 220 might not be able to receive the original data transmitted by the communication source 210, as describe above with reference to the mathematical models.

In an aspect, the communication source 210 or the communication destination 220 may be any one of the EVs 170, the EVSEs 145, the smart devices 175, and the remote layer 110 of FIG. 1. Since the communication is bi-directional, the communication source 210 and the communication destination 220 may be exchangeable. That means that, when a first communication party sends data to a second communication party, the sender or the first communication party acts as the communication source 210 and the receiver or the second communication party acts as the communication destination 220. Conversely, when the second communication party sends data to the first communication party, the second communication party acts as the communication source 210 and the first communication party acts as the communication destination 220.

In a first case where the communication source 210 is the EVSE 145 and the communication destination is the smart device 175, the attacker may inject false data into the reference load profile so that the EVSE 145 charges the EV 165 based on the compromised reference load profile. On the other hand, in a second case where the communication source 210 is the smart device 175 and the communication destination is the EVSE 145, the attacker may inject false information of the EV 165 to the EVSE 145 so that, based on the compromised EV information, the EVSE 145 charges the EV 165 with the reference load profile or desired charge, which is not suited for the type of the EV 165. Thus, even though the descriptions in this disclosure focus on the first case, persons having skill in the art would appreciate that the scope of this disclosure is not limited to the first case but expands to the second case.

In another aspect, the communication source 210 or the communication destination 220 are not limited to any communication devices in the EV communication infrastructure 100 but can be any other communication devices in communication systems where control and sensory data are communicated.

The IoT devices 250a-250n may replicate the data transmitted by the communication source 210. The replication of the data may be performed under the control of the security system 200 or by themselves. Collectively, the IoT devices 250 may be used hereinafter. In an aspect, each of the IoT devices 250 may copy or replicate a whole of the data so that the replicated data by the IoT device 250a may be the same as the replicated data by the IoT device 250b.

In an aspect, the communication channel between the communication source 210 and the IoT devices 250 may be performed over an out-of-band private data exchange network, which cannot be accessed external to the communication channel. In other words, the communicated data may be transmitted through a communication channel, which is different or isolated from the main communication channel (e.g., Internet, Wi-Fi, Modbus, and DNP3) so that the attacker 240 is not able to intercept or access the communicated data between the communication source 210 and the IoT devices 250. In another aspect, the communication channel between the communication source 210 and the IoT devices 250 may follow peer-to-peer publish-subscribe communication scheme, which enables information streams to be reliably disseminated to several replications, while maintaining network performance.

After the IoT devices 250 replicate the data and while the security system 200 receives the replicated data from the IoT device 250, the attacker 240 may be able to intercept the replicated data by one IoT device 250 and injects false data to the replicated data, because the communication channel between the IoT devices 250 and the security system 200 is the main or public communication channel, which can be accessed external to the main communication channel. The security system 200 may be able to minimize effects from the malicious false data, which compromises one replica, based on other replicas via two additional layers, which are a random replica activation (RRA) layer and a majority vote input (MVI) layer to the communication channel between the communication source 210 and the communication destination 220.

With reference to FIG. 3 and from the data transmission view, disclosed are two additional layers of RRA and the MVI to the moving target defense (MTD) strategy. Sensory and/or control data 310 may include sensor data such as temperature, pressure, and velocity, and control command such as injected voltage, open/close of a valve. When the sensory and/or control data 310 is transmitted by the communication source (e.g., the communication source 210 of FIG. 2), the security system (e.g., the security system 200 of FIG. 2) may randomly group the IoT devices to create several groups, for example, a group of IoT devices 330a and 320e, a group of IoT devices 320b, 320c, 320d, and 320n, and other groups. The number of groups and the number of IoT devices in each group may be determined based on the total number of IoT devices and dynamics of the communication environment. In an aspect, instead of creating groups of IoT devices, the random grouping may be performed by simply selecting a random number of IoT devices from among the IoT devices 320.

As described above, the communication channel, through which the IoT devices 320 receive data 310, is private to external devices or attackers. On the other hand, the replicas by the IoT devices 250 to be transmitted to the security system 200 through the main or conventional communication channel may be susceptible to the attacker 240 due to the lack of authentication and encryption. Even with the peer-to-peer publish-subscribe communication scheme, the attacker 240 may be able to subscribe to the data 310 when the attacker 240 knows the corresponding encryption keys and ID of the publish-subscribe communication scheme.

The security system may randomly activate replicas of the data 310, meaning that one or more IoT devices 320 are activated in the RRA layer 330 so that only the activated IoT devices 320 or activated replicas are transmitted. For example, when one group with two IoT devices (e.g., 320a and 320e) is randomly activated, two replicas will be transmitted, and when one group with four IoT devices (320b, 320c, 320d, and 320n) are randomly activated, four replicas will be transmitted.

Even assuming that that attackers may be able to eavesdrop or intercept one of the replicas in the RRA layer 330, the attackers have no idea about the random activation of the IoT devices 320 and about whether the intercepted replica is included in the activated replicas. In mathematical terminologies, the IoT devices 320 can be represented in a set notation, such as $\{y_1, y_2, \ldots y_n\}$ or simply $\{y_i\}$, and each $y_i$ is an IoT device. Then, random groups formed by $\{y_i\}$ are elements of the non-empty power set, which includes all subsets of $\{y_i\}$ including $\{y_i\}$ itself except the empty set. For example, when there are three IoT devices or the IoT set is $\{y_1, y_2, y_3\}$, the non-empty power set includes 7 groups and can be represented by $\{\{y_1\}, \{y_2\}, \{y_3\}, \{y_1, y_2\}, \{y_1, y_3\}, \{y_2, y_3\}, \{y_1, y_2, y_3\}\}$.

When an attacker intercepts or eavesdrops one replica by one IoT device, namely $y_1$, the eavesdropped replica may be activated by four in seven occasions because there are seven groups and four groups include $y_1$. By generalizing this concept with "n" numbers of IoT devices, the probability that one intercepted or eavesdropped replica is activated is:

$$\frac{2^{n-1}}{2^n - 1}, \quad (6)$$

with an assumption that every group can be uniformly activated. For example, with 2 IoT devices, the probability that the intercepted or eavesdropped replica is activated is ⅔ or about 67%, with 3 IoT devices, the probability is 4/7 or about 57.1%, and with 5 IoT devices, the probability is 16/31 or about 51.6%. The probability converges to ½ or 50% as the number of IoT devices increases. Thus, the RRA layer 330 reduces the observable information from an attacked IoT device by up to 50%, thereby reducing attacker's ability to perform reconnaissance the EV charging infrastructure.

This scenario is for one source or one sensor in the EV charging infrastructure. Generally, the EV charging infrastructure includes many sensors. Thus, when each source or sensor in the EV charging infrastructure is equipped with corresponding numbers of IoT devices, the whole performance to reduce attacker's ability to reconnaissance by the RRA layer 330 can be substantial in the EV charging infrastructure.

Figure 4:
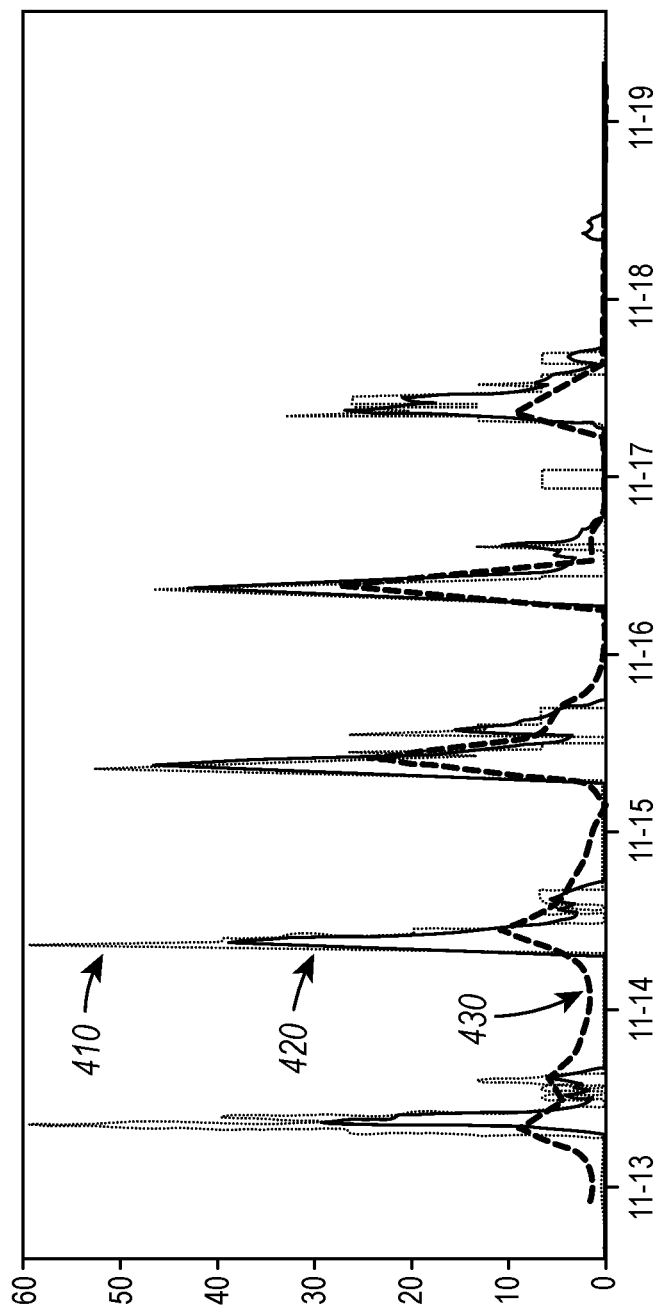
FIG. 4 depicts data plots of actual and predicted electric vehicle (EV) charging load for a facility as representative of adversarial reconnaissance attached in various situations according to embodiments of the present disclosure.

Now referring to FIG. 4, illustrated is data plots 410-430 of actual and predicted facility EV charging load for at an EVSE or EV charging station as representative of adversarial reconnaissance attacks to show benefits with incorporation of the RRA layer in the communication channel. The horizontal axis represents dates by days from November 13 to November 19, and the vertical axis represents facility EV loads in kilowatts (kW).

The data plot 410 shows actual facility EV loads at the charging station every 5 minutes. The facility EV loads jump to the highest, about 60 kW, at one time on November 13 and 14. The moment of reaching the daily maximum of 60 kW on November 13 and 14 is the most vulnerable time when attackers can have the greatest capacity to disrupt charging. Likewise, there are vulnerable times at the peak moment or the daily maximum each day.

The attackers may deploy a long short-term memory (LSTM) model to learn and predict the total EV charging load and the load trend by performing reconnaissance. LSTM models are particularly well suited to learn this type of time-series data due to their ability to incorporate long-term dependencies in their training. With access to perfect knowledge of the system's total EV load, the attackers are able to deploy an LSTM model that can accurately predict the daily charging patterns of EVs at the target facility. Prediction by this LSTM model is represented by the data plot 420. As times goes by, the prediction by the LSTM model is substantially close to the actual facility EV loads. For example, differences between the predicted maximum in the data plot 420 and the actual maximum in the data plot 410 each day become smaller and smaller day by day. Further, the data plot 420 follows the dominant trends in the data plot 410.

Based on the data plots 410 and 420, a mean absolute error (MAE) can be measured to be 6.67 kW, meaning that the attackers can predict the trend in the actual facility EV loads with the MAE of 6.67 kW.

When the RRA layer is added to the communication channel with IoT devices, the RRA layer reduces the observable information from the attackers. For example, three IoT devices are utilized in FIG. 4. As described above, with three IoT devices, the probability that the intercepted or eavesdropped replica is activated is 4/7 or about 57.1%.

The RRA layer randomly activates replica sensors, thereby leaving the attacker with incomplete system information. When the attacker's eavesdropped replica is not activated, the prediction model has to rely on the previous value for model training. Consequently, the attacker's observable training dataset is degraded by the MAE of 1.85 kW and a maximum training sample error of 46.2 kW when compared to the data plot 410. Consequently, the attacker's prediction of facility EV loads is degraded as shown by the data plot 430. The RRA layer increases prediction MAE for the attacker from 6.67 kW to 8.52 kW, an increase in uncertainty of 27.6%, and importantly obscures the actual peak facility EV load.

Now returning back to FIG. 3, the MVI layer 340 is added to the communication channel in addition to the RRA layer 330. In an aspect, the communication channel in the RRA layer 330 is different from the communication channel in the MVI layer 340. In particular, the communication channel in the RRA layer 330 may be private and the communication channel in the MVI layer 340 may be public.

The MVI layer 340 may introduce an additional layer of uncertainty that reduces the expected successful input of false data via a compromised replicated data. The MVI layer 340 outputs a median value among the inputs. The median output by the MVI layer 340 reduces effects from the FDI attack's input. In a case where the compromised replica is not activated at all in the RRA layer 330 or is outvoted by the MVI layer 340, 0% of the FDI replica is received by the system. In a case where a true replica and the compromised replica are activated as part of a group of size two by the RRA layer 330, the MVI layer 340 will result in a tie vote and the median value includes 50% of the FDI value. In a case where the compromised replica is activated by the RRA layer 330 in a group of size one, 100% of the FDI value is received by the system. This worst-case scenario occurs with a very low probability as the number of IoT devices increases.

For example, with three IoT devices, when the data 310 is a value "5," all replicated data will have a value "5" as well. In a scenario that an attacker successfully compromises one replicated data and changed the value to zero, the replicated data by three IoT devices are then 0, 5, and 5. As described above, the non-empty power set of three IoT devices includes 7 groups, such as $\{\{y_1\}, \{y_2\}, \{y_3\}, \{y_1, y_2\}, \{y_1, y_3\}, \{y_2, y_3\}, \{y_1, y_2, y_3\}\}$, where $y_1$ is 0 and $y_2$ and $y_3$ are 5. When one group including only the compromised replica is activated in the RRA layer 330, the MVI layer 340 also output the compromised replica, which is zero, thereby disrupting the system. However, when the group activated by the RRA layer 330 includes two or more replicas, the output from the MVI layer 430 is close to or equal to 5. Following table shows outputs from the MVI layer 340 when one of the seven groups are selected from the RRA layer 330.

| Selected Group | Output from the MVI layer 340 |
|---|---|
| $\{y_1\} = \{0\}$ | 0 |
| $\{y_2\} = \{5\}$ | 5 |
| $\{y_3\} = \{5\}$ | 5 |
| $\{y_1, y_2\} = \{0, 5\}$ | 2.5 |
| $\{y_1, y_3\} = \{0, 5\}$ | 2.5 |
| $\{y_2, y_3\} = \{5, 5\}$ | 5 |
| $\{y_1, y_2, y_3\} = \{0, 5, 5\}$ | 5 |

Thus, with the uniform possibility in selecting each group, the expected output is about 3.57 based on the following calculation:

$$0*\frac{1}{7}+5*\frac{1}{7}+5*\frac{1}{7}+2.5*\frac{1}{7}+2.5*\frac{1}{7}+5*\frac{1}{7}+5*\frac{1}{7}=\frac{25}{7}\approx 3.57.$$

Compared to the intended true output, which is 5, the error between 5 and 3.57 is 1.43, which is about 28.6%.

With n IoT devices and uniform random distribution in selection of one group from the non-empty power set, the expected value $E(\delta)$ from the MVI layer 340 after the RRA layer 330 is:

$$E(\delta) = \frac{n+1}{2(2^n - 1)} * \delta, \quad (7)$$

where $\delta$ is the FDI attacked value. This expected value $E(\delta)$ is calculated in the same way as described above with three IoT devices. When one group is selected by the RRA layer 330, there are three scenarios: the selected group includes (1) one replica, (2) two replicas, and (3) three or more replicas. The probability of selecting one group is uniformly $$\frac{1}{2^n - 1}$$

because the non-empty power set has $2^n-1$ groups. The following table shows the expected value for each scenario with the corresponding reason.

| Number or replicas in the selected group | Expected value from the compromised replica | Reason |
|---|---|---|
| One replica | $\frac{1}{2^n - 1} * \delta$ | There is only one group with the compromised replica. |
| Two replicas | $\frac{1}{2^n - 1} * \frac{\delta}{2} * (n - 1)$ | There are (n − 1) groups including the compromised replica and $\delta/2$ is attributed to the median value. |
| Three or more replicas | 0 | The number of true replicas is greater than the number of compromised replicas. Thus, there is no effects from the compromised data. |

Thus, the expected value $E(\delta)$ is $$\frac{n+1}{2(2^n - 1)} * \delta$$

based on the following summation:

$$E(\delta) = \frac{1}{2^n - 1} * \delta + \frac{1}{2^n - 1} * \frac{\delta}{2} * (n-1) + 0 = \frac{n+1}{2(2^n - 1)} * \delta. \quad (8)$$

As the denominator in the expected value $E(\delta)$ of the false data injection attack grows exponentially and the numerator in the expected value $E(\delta)$ grows linearly, the expected value $E(\delta)$ converges to zero as the number of IoT devices grows. For example, the expected impact by the false data injection reduces in the MVI layer 340 by about 50%, 71%, 83%, 90%, and 94% for replica sets of size n=2, 3, 4, 5, and 6, respectively. Thus, adding cheap five or more than five IoT devices will decrease the probability significantly.

Figure 5:
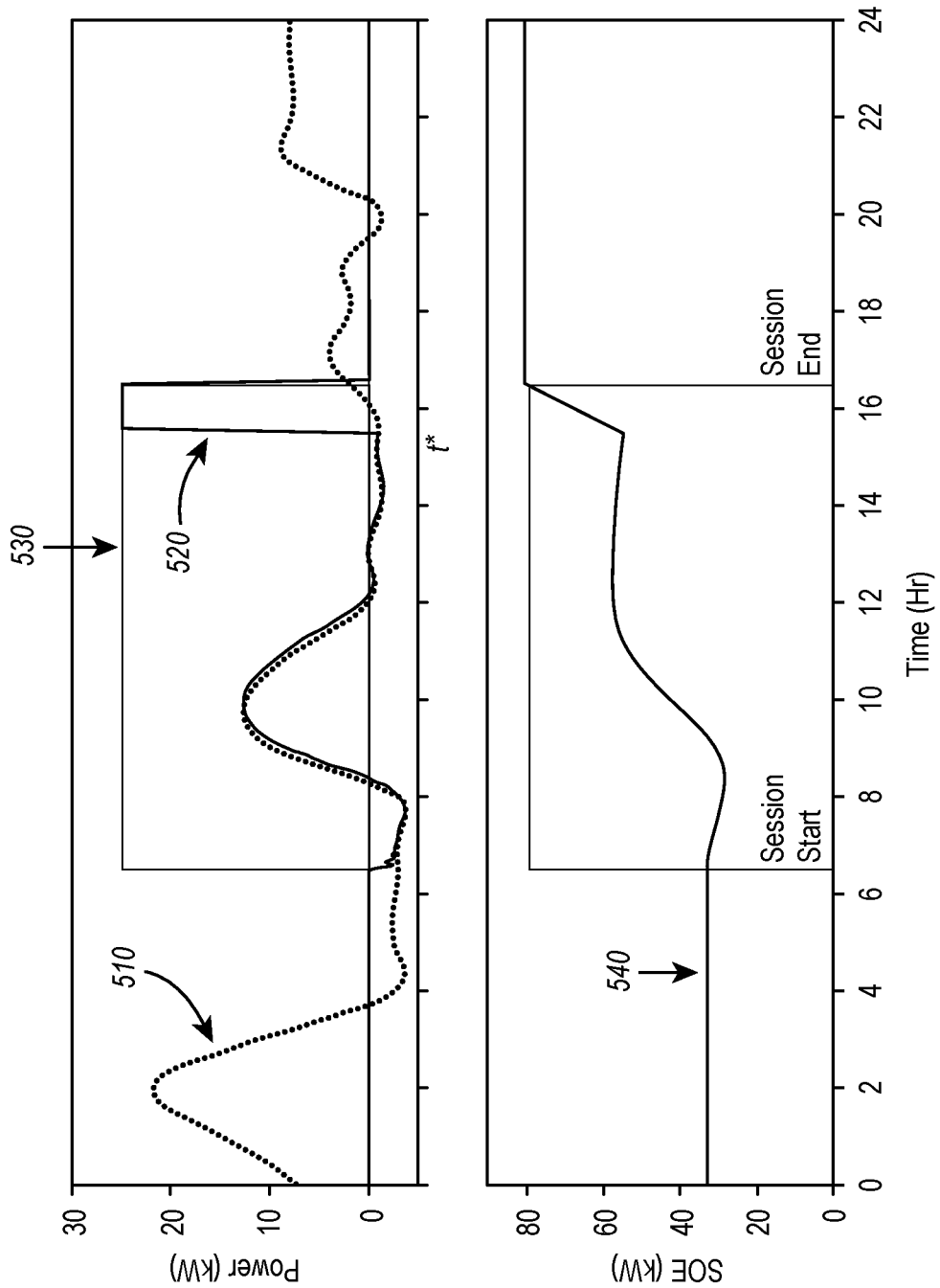
FIG. 5 depicts data plots of EV charging performance for a no-attack scenario according to embodiments of the present disclosure.
Figure 6:
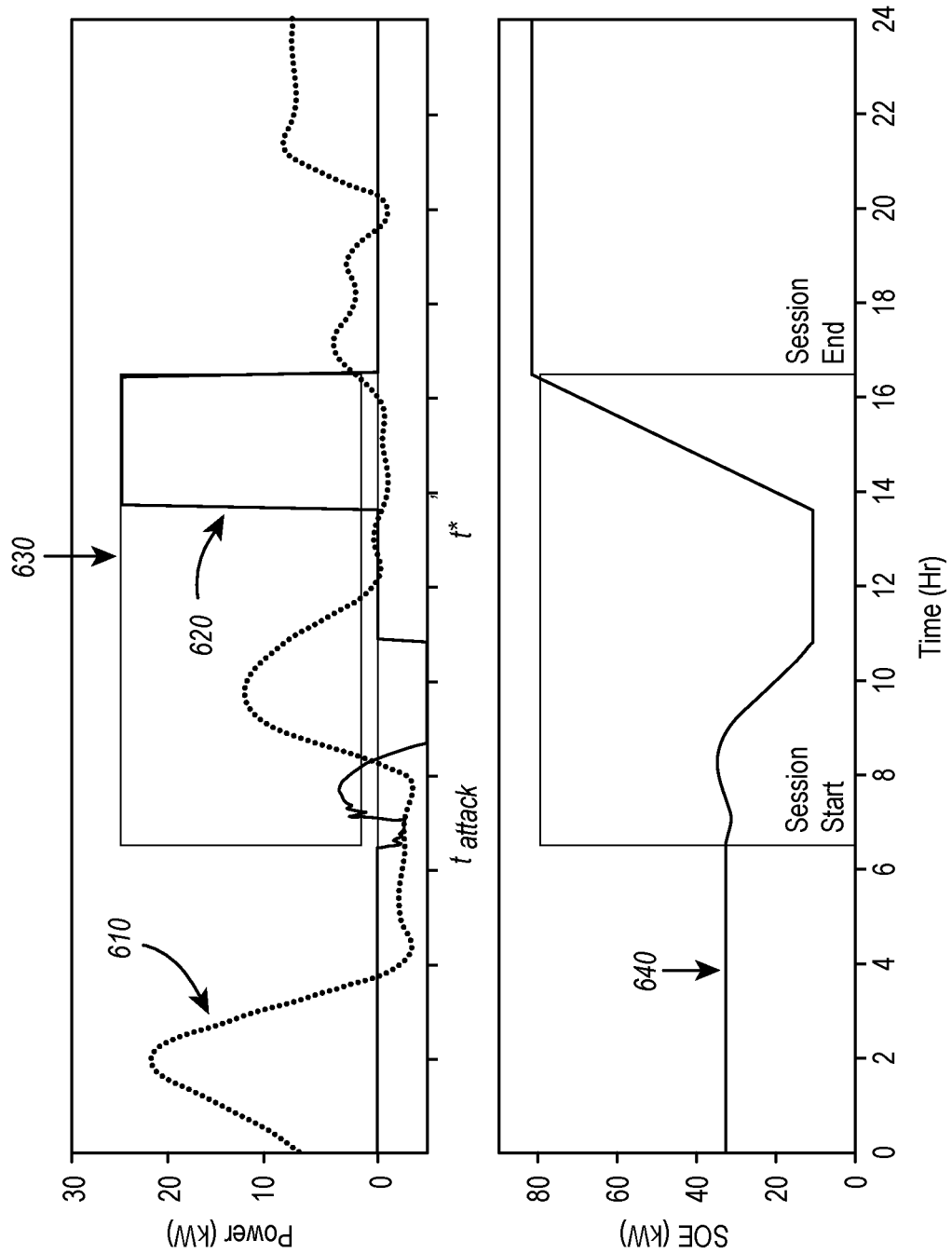
FIG. 6 depicts data plots of EV charging performance for an attack scenario according to embodiments of the present disclosure.
Figure 7:
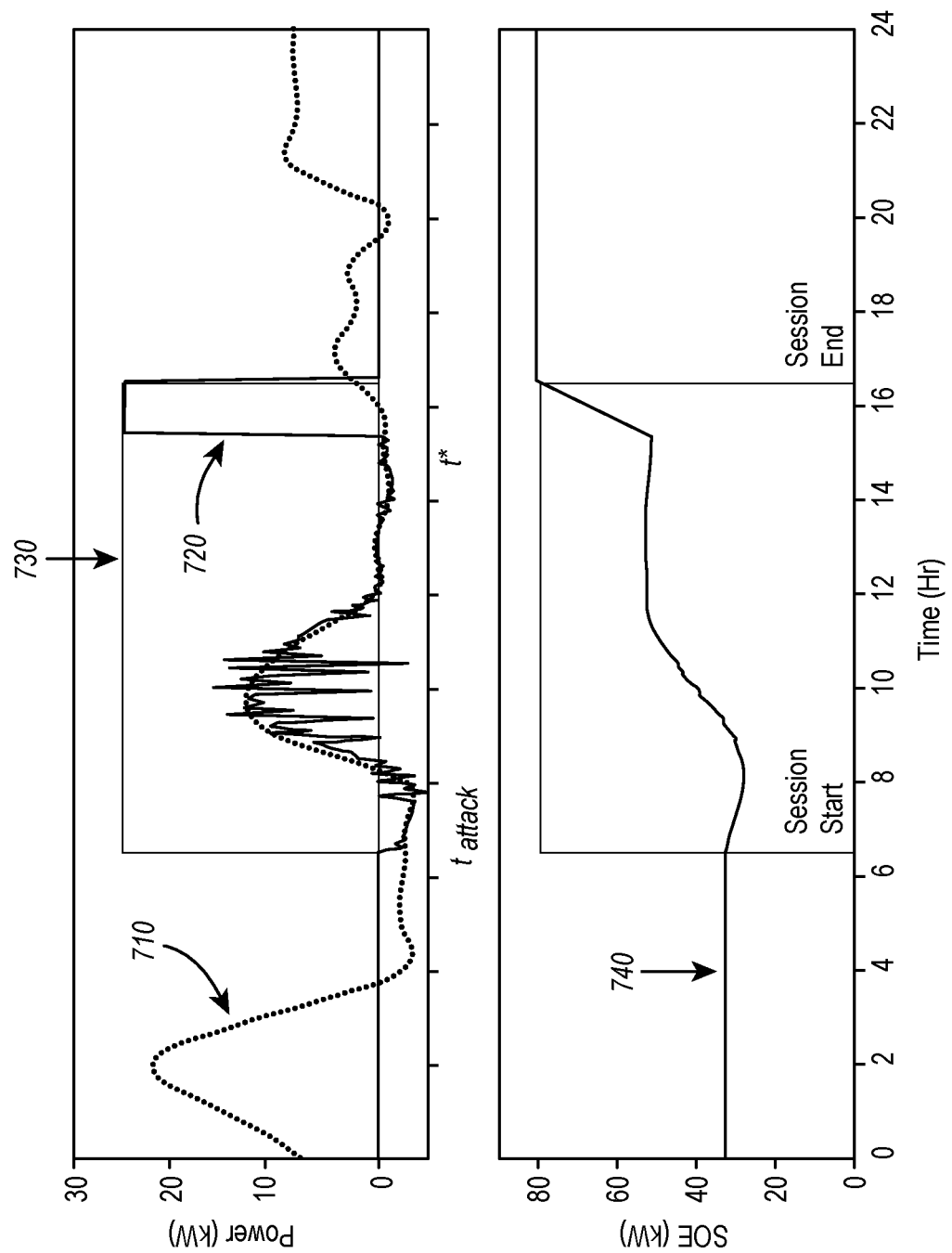
FIG. 7 depicts data plots of EV charging performance under an attack scenario in addition of a random replica activation majority vote input strategy according to embodiments of the present disclosure.
Figure 8:
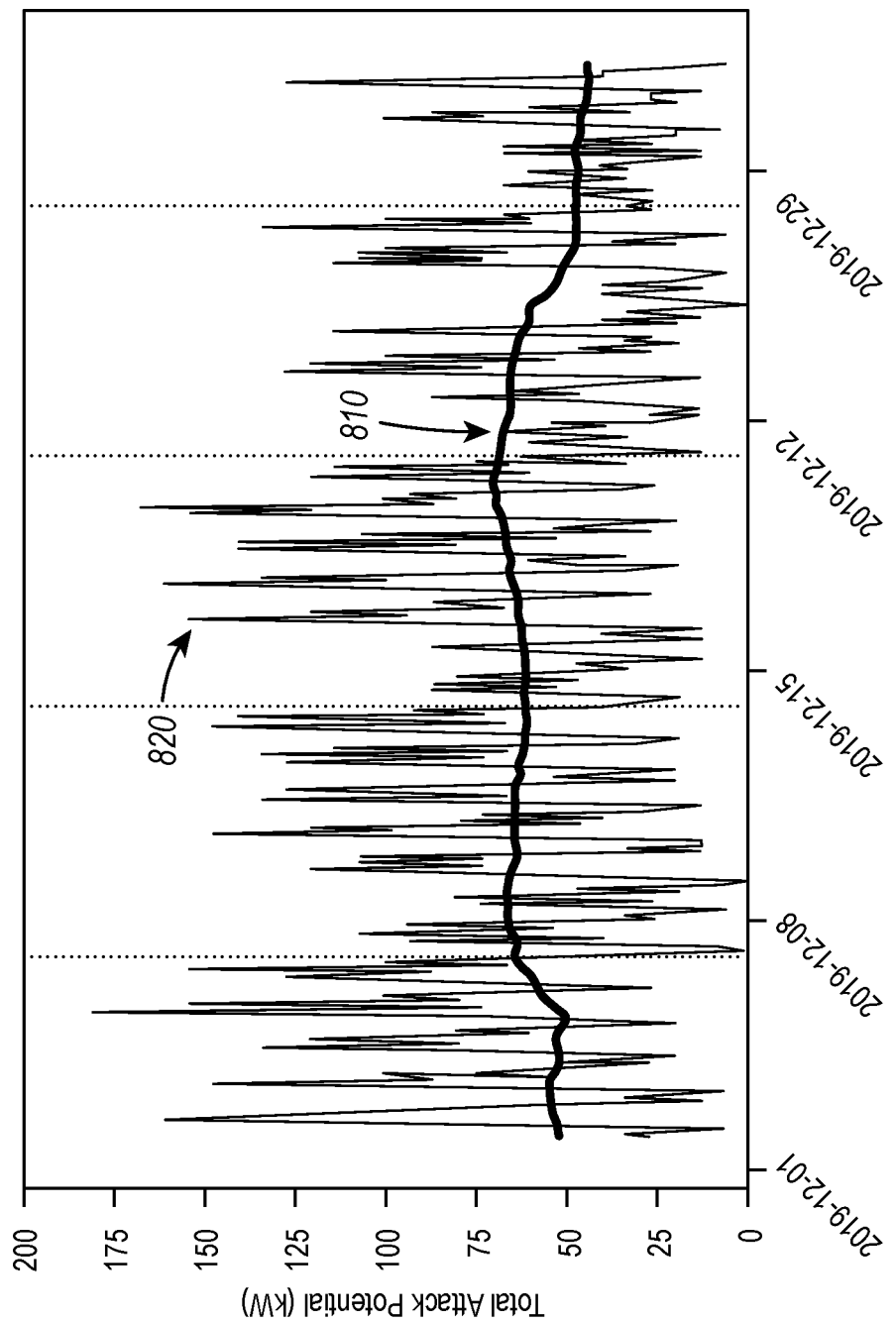
FIG. 8 depicts data plots for expected attack impacts according to embodiments of the present disclosure.

FIGS. 5-7 graphically illustrates how the RRA layer and the MVI layer reduce the attackers' ability to disrupt the operations of the system according to embodiments of the present disclosure. In particular, regarding charging operations at a charging station over the 24-hour period, FIG. 5 shows EV charging performance in the first scenario without any attacks, FIG. 6 shows EV charging performance in the second scenario with opposition attacks, and FIG. 7 shows EV charging performance in the third scenario with opposition attacks and the MVI layer.

In the first scenario without any attack as illustrated in FIG. 5, a data plot 510 shows a reference load profile and a data plot 520 shows a power charging profile. The grey box 530 indicates a single charging session starting from a session start time $t_{start}$ and ending at a session end time $t_{end}$. The charging session is divided by 288 timesteps, each of which is 5 minutes long. The session start time $t_{start}$ is at the $78^{th}$ timestep or at about 6:30 am and the session end time $t_{end}$ is at $198^{th}$ timestep or at about 4:30 μm. The EV may have a data plot 540 showing the state of energy (SOE) $Q(t)$ during the 24-hour period.

When an EV is connected to the charging station at $t_{start}$, the initial SOE, $Q(t_{start})$ is about 33 kWh. The desired SOE $Q(t_{end})$ by the EV is about 78 kWh. As shown in the reference load profile 510, the maximum power output of about 25 kWDC by the charging station is provided starting from a forced charging start time t*, which is at about the last one hour prior to the session end time $t_{end}$. Between $t_{start}$ and t*, the power charging profile is based on the difference between the reference load profile 510 and the power charging profile 520, and between t* and $t_{end}$, the EV is charged with the maximum power output regardless of the reference load profile 510, according to the equation (4) above.

The reference load profile 510 is in the negative for about one hour after $t_{start}$ so that the SOE 540 of the EV is discharging and goes down. When the reference load profile 510 is above the zero power, the EV starts being charged as shown in the positive inclination of the SOE 540. After the forced charging start time t*, the EV is rapidly charged with the maximum power output to 78 kWh, which is the desired SOE $\hat{Q}(t_{end})$. Since there is no attack during the charging session, the power charging profile 520 generally follows the reference load profile 510. In an aspect, there may be a difference threshold between the desired SOE $\hat{Q}(t_{end})$ and the EV's SOE 540. The difference threshold may be, for example, 0.02 kWh. The MAE between the power charging profile 520 and the reference load profile 510 may be, for example, 0.55 kW. The difference threshold and the MAE may be maintained based on the PI feedback control scheme with appropriate proportional and integration gains (e.g., $K_P$ and $K_I$ as shown in equation (4)). In an aspect, when specific values for the difference threshold and the MAE are required in the charging station, the proportional and integration gains may be determined based on the specific values. In another aspect, when the proportional and integration gains are not sufficient to achieve the required specific values, a derivative gain KD may be employed to the PI feedback control scheme so that the charging station may have a PID feedback control scheme.

The second scenario is shown in FIG. 6 with opposition attacks without the RRA layer and the MVI layer. A data plot 610 shows a reference load profile, which is the same as the reference load profile 510, and a data plot 620 shows a false data injection profile, which is different from the power charging profile 520 due to the opposition attacks. Likewise, a data plot 640 showing the SOE Q(t) of the EV is different from the SOE 540 due to the opposition attacks.

After the attacker has learned the trend of the reference load profile 610 for a period of time, the attacker initiates an attack at $t_{attack}$ or at 7:30 am and injects the false data injection profile 620, which is an inversion of the reference load profile 610. In other words, the charging system receives the false data injection profile 620 instead of the reference load profile 610, as shown in equation (5) above, in which the reference load profile ŷ(t) in equation (4) is replaced with the false data injection profile 620 w(t).

Due to the false data injection profile 620, the SOE 640 of the EV is deviated from the desired SOE 540. Thus, a new forced charging start time t*' is calculated to be about 1:40 pm based on equation (3) above and is much earlier than the desired forced charging start time t*, 3:30 pm. After the new forced charging start time t*', the charging station goes into the forced charging state to achieve the desired SOE $Q(t_{end})$ or about 78 kWh by the session end time $t_{end}$. However, before the new forced charging start time t*', the EV experiences a deep discharge cycle at the expense of flexibility service. As a result, the MAE is calculated to be 13.21 kW between the reference load profile 610 and the EV charging profile. In this way, attackers disrupt the charging station's operations. Further, the final charge amount, $Q(t_{end})$, is about 1.70 kWh different from the desired SOE $\hat{Q}(t_{end})$.

The third scenario is addition of the RRA layer and the MVI layer to the second scenario and the results of the third scenario is illustrated in FIG. 7. As described above, after learning the trend of the reference load profile 710, which is the same as the reference load profiles 510 and 610, the attacker injects the false data injection profile, which is the inversion of the reference load profile 710. In this case, three IoT devices are employed in both the RRA layer and the MVI layer.

Between $t_{start}$ and t*, the charging profile 720 is different from the reference load profile 710 but generally follows the reference load profile 710. Due to the input limiting benefits based on the MVI strategy, the MVI layer reduces the MAE between the reference load profile 710 and the charging profile 720. In particular, the MAE of 13.21 kW in the second scenario is reduced to 3.78 kW in the third scenario. Further, the final charge amount, $Q(t_{end})$, is about 0.59 kWh different from the desired SOE $\hat{Q}(t_{end})$. In these three scenarios, the MVI layer significantly reduces the attacker's ability to disrupt the charging station's operations.

Figure 9:
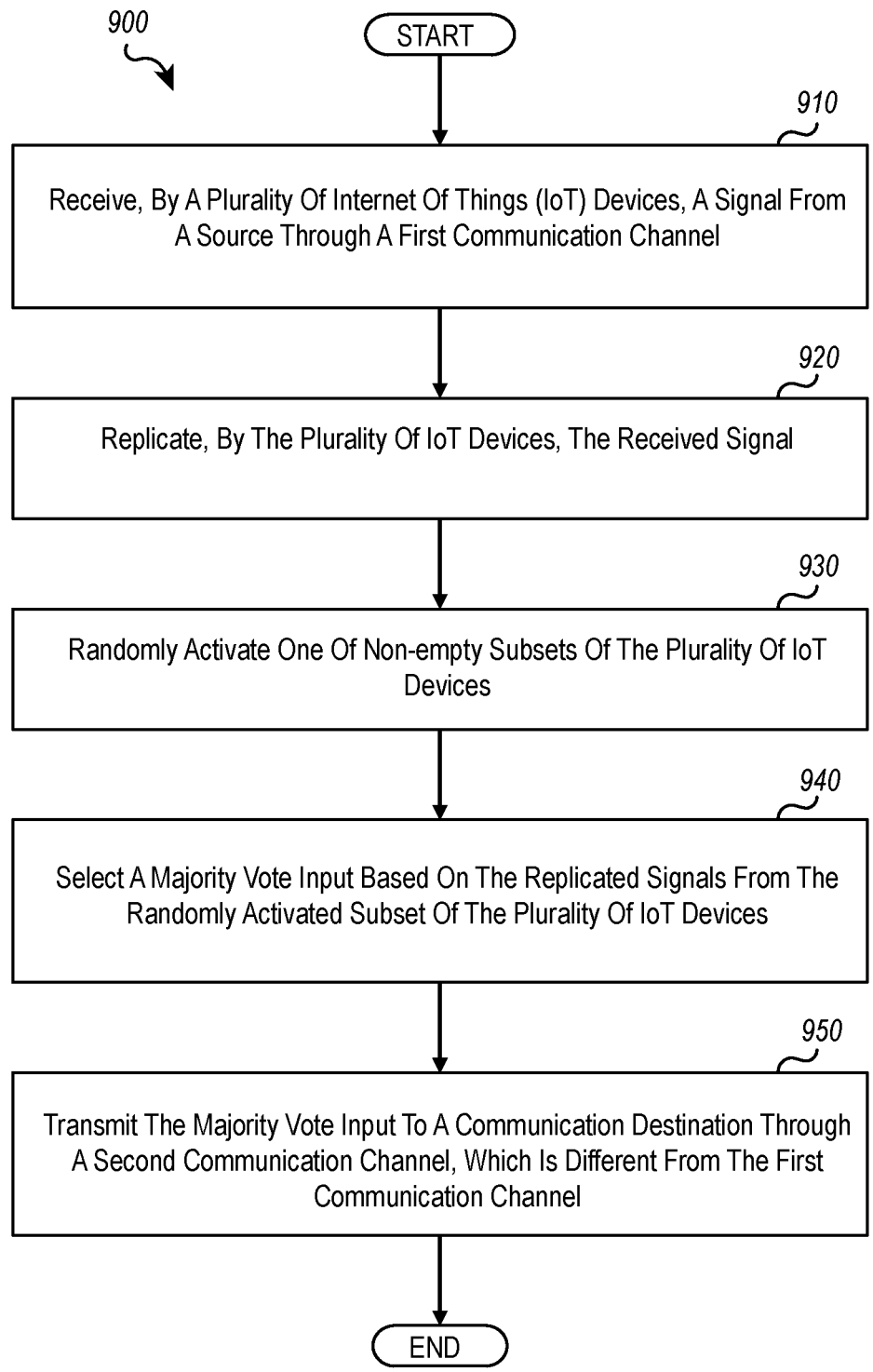
FIG. 9 depicts a flowchart of a security method for increasing security for devices utilizing a communication channel according to embodiments of the present disclosure.

Now reference to FIG. 9, illustrated is a flowchart of a security method 900 employing the RRA layer and the MVI layer in the MTD strategy according to embodiments of the present disclosure. The security method 900 may be utilized by power grid systems, electric charging systems, or any communication system using sensory and control data in the communication. The security method 900 starts by receiving, by a plurality of IoT devices, data from a communication source through a first communication channel at step 910. This first communication channel may be a private channel, which an attacker may not be able to eavesdrop or intercept the data in the transit between the communication source and the plurality of IoT devices without knowing the first communication channel.

At step 920, the data is received and replicated by a plurality of IoT devices. These replicated data may confuse potential attackers by obfuscating the communication source. Further, when there are more than one communication source and data from each communication source are replicated by corresponding IoT devices, potential attackers may be confused because they do not likely identify the true communication source due to many replicated data by the IoT devices.

One or more IoT devices may be randomly activated at step 930. In a case where there are n IoT devices, there are $2^n-1$ numbers of possible random activations. In other words, only one among the $2^n-1$ possible random activations is activated at step 930. In this random replica activation (RRA) layer, the possibility that a replica compromised by the attacker is activated is $$\frac{2^{n-1}}{2^n - 1}$$

according to equation (6) above. Thus, the RRA layer is able to reduce the observable information of an attached device by up to 50%, thereby reducing attacker's ability to perform reconnaissance to identify a data trend.

At step 940, a majority vote input is selected among the replicated data in the activated IoT devices. The majority vote input may be a median, which separates the whole replicated data from the top half and the bottom half in magnitude. In a case where there are odd numbers of replicated data, the middle one is the median when the replicated data are sorted in order. In another case where there are even numbers of replicated data, the average of two middle ones is the median when the replicated data are sorted in order.

If the attacker injected false data to or compromised one replicated data, only one compromised replica is different from the other (n−1) replicas. Under this situation, when the randomly selected group has three or more replicas and one of them is the compromised replica, the median is the non-compromised replica because the compromised replica is listed as the least or the greatest when sorted in order and the median cannot be the least and the greatest. In other words, the compromised replica has no effect on the median due to the MVI strategy or the MVI layer at step 940.

That means there are two cases where the compromised replica has effect on the median: the first one is when the randomly selected group has only one replica and the second case is when the randomly selected group has only two replicas. In a case where the randomly selected group has only one replica, there is only one case where the compromised replica is in the randomly selected group, and in a case where the randomly selected group has only two replicas, there are (n−1) cases where the compromised replica is in the randomly selected group. Thus, the expected value of the false injection data is $$\frac{n+1}{2(2^n-1)} * \delta$$

as calculated in calculation (8) above, where the magnitude of the false injection data is δ.

At step 950, the majority vote input is transmitted to a communication destination through a second communication channel. Based on the RRA layer at step 930 and the MVI layer at 940, the effect of the FDI attack is substantially decreased. In an aspect, the second communication channel may be a public communication network, which is different from the first communication channel.

Figure 10:
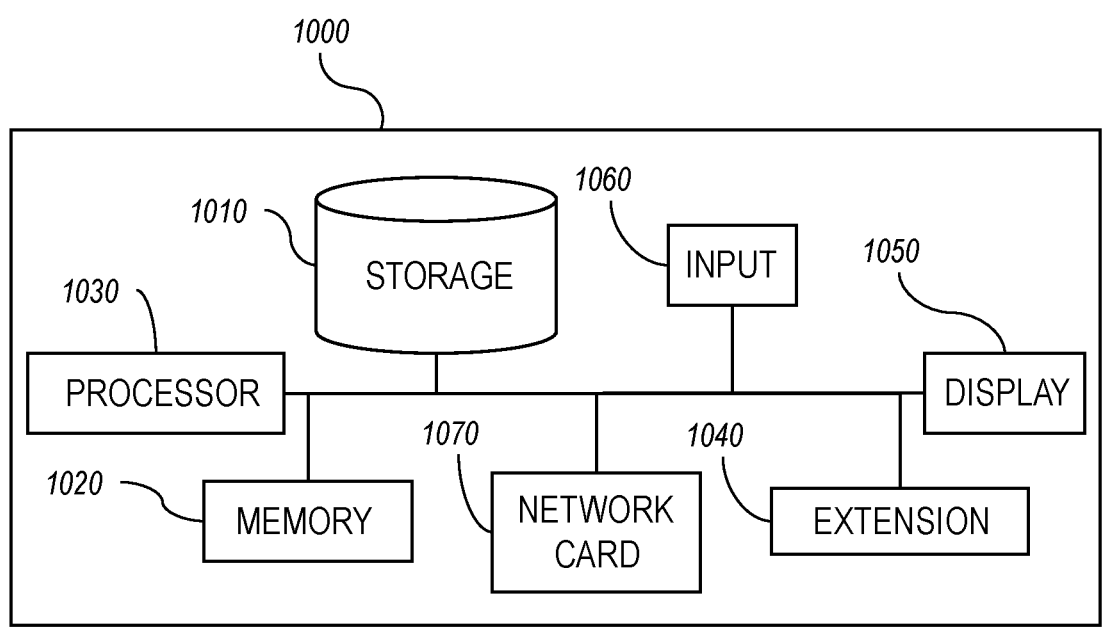
FIG. 10 depicts a block diagram of a computing device according to embodiments of the present disclosure.

Attention will now be directed to FIG. 10, which illustrates a computing device 1000 representative of the smart device 175, the controller of the electric vehicle 170, and the security system 200 of FIG. 2, the controller 400 of FIG. 4, or any computing modules, units, and devices described herein. The computing device 1000 may include, by way of non-limiting examples, server computers, cloud computers, desktop computers, laptop computers, notebook computers, sub-notebook computers, netbook computers, netpad computers, set-top computers, handheld computers, Internet appliances, mobile smartphones, tablet computers, personal digital assistants, video game consoles, embedded computers, smart watches, smart sensors or other devices capable of performing calculations/operations. Those of skill in the art will recognize that many smartphones are suitable for use in the system described herein. Suitable tablet computers include those with booklet, slate, and convertible configurations, known to those of skill in the art.

The computing device 1000 includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the computing device 1000 may include a storage 1010. The storage 1010 is one or more physical apparatus used to store data or programs on a temporary or permanent basis. In some embodiments, the storage 1010 may be volatile memory and requires power to maintain stored information. In some embodiments, the storage 1010 may be non-volatile memory and retains stored information when the computing device 1000 is not powered. In some embodiments, the non-volatile memory includes flash memory. In some embodiments, the non-volatile memory includes dynamic random-access memory (DRAM). In some embodiments, the non-volatile memory includes ferroelectric random-access memory (FRAM). In some embodiments, the non-volatile memory includes phase-change random access memory (PRAM). In some embodiments, the storage 1010 includes, by way of non-limiting examples, CD-ROMs, DVDs, flash memory devices, magnetic disk drives, magnetic tapes drives, optical disk drives, and cloud computing-based storage. In some embodiments, the storage 1010 may be a combination of devices such as those disclosed herein.

The storage 1010 includes executable instructions (i.e., compiled codes or machine codes). The executable instructions represent instructions that are executable by the processor 1030 of the computing device 1000 to perform the disclosed operations, such as those described in the various methods. Furthermore, the storage 1010 excludes data, carrier waves, and propagating data. On the other hand, the storage 1010 that carry computer-executable instructions may be "transmission media" and include data, carrier waves, and propagating data. Thus, by way of example and not limitation, the current embodiments may include at least two distinctly different kinds of computer-readable media: computer storage media and transmission media.

The computing device 1000 further includes a processor 1030, an extension 1040, a display 1050, an input device 1060, and a network card 1070. The processor 1030 is a brain to the computing device 1000. The processor 1030 executes instructions which implement tasks or functions of programs. When a user executes a program, the processor 1030 reads the program stored in the storage 1010, loads the program on the RAM, and executes instructions prescribed by the program.

The processor 1030 may include, without limitation, Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware by performing the basic arithmetic, logical, control and input/output (I/O) operations specified by the instructions. As used herein, terms such as "executable module," "executable component," "component," "module," or "engine" may refer to the processor 1030 or to software objects, routines, or methods that may be executed by the processor 1030 of the computing device 1000. The different components, modules, engines, and services described herein may be implemented as objects or the processor 1030 that execute on the computing device 1000 (e.g., as separate threads).

In embodiments, the extension 1040 may include several ports, such as one or more universal serial buses (USBs), IEEE 1394 ports, parallel ports, and/or expansion slots such as peripheral component interconnect (PCI) and PCI express (PCIe). The extension 1040 is not limited to the list but may include other slots or ports that may be used for appropriate purposes. The extension 1040 may be used to install hardware or add additional functionalities to a computer that may facilitate the purposes of the computer. For example, a USB port may be used for adding additional storage to the computer and/or an IEEE 1394 may be used for receiving moving/still image data.

In some embodiments, the display 1050 may be a cathode ray tube (CRT), a liquid crystal display (LCD), or light emitting diode (LED). In some embodiments, the display 1050 may be a thin film transistor liquid crystal display (TFT-LCD). In some embodiments, the display 1050 may be an organic light emitting diode (OLED) display. In various some embodiments, the OLED display is a passive-matrix OLED (PMOLED) or active-matrix OLED (AMOLED) display. In some embodiments, the display 1050 may be a plasma display. In some embodiments, the display 1050 may be a video projector. In some embodiments, the display may be interactive (e.g., having a touch screen or a sensor such as a camera, a 3D sensor, a LiDAR, a radar, etc.) that may detect user interactions/gestures/responses and the like.

A user may input and/or modify data via the input device 1060 that may include a keyboard, a mouse, or any other device with which the use may input data. The display 1050 displays data on a screen of the display 1050. The display 1050 may be a touch screen so that the display 1050 may be used as an input device.

The network card 1070 is used to communicate with other computing devices, wirelessly or via a wired connection. Through the network card 1070, one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computing device 1000 may include one or more communication channels that are used to communicate via the network card 1070. Data or desired program codes are carried or transmitted in the form of computer-executable instructions or in the form of data structures vi the network card 1070.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the FIGS.

Any of the herein described methods, programs, algorithms or codes may be converted to or expressed in one or more programming languages or computer programs. The terms "programming language" and "computer program," as used herein, each include any language used to specify instructions to a computer, and include (but is not limited to) the following languages and their derivatives: Assembler, Basic, Batch files, BCPL, C, C+, C++, C#, Delphi, Fortran, Java, JavaScript, machine code, operating system command languages, Pascal, Perl, PLI, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A security system for enhancing security of a device utilizing a communication channel, the security system comprising:
   one or more processors; and
   a storage including instructions stored thereon that, when executed by the one or more processors, cause the security system to:
   receive, by a plurality of Internet of Thing (IoT) devices, data from a communication source through a first communication channel;
   replicate, by the plurality of IoT devices, the received data;
   randomly activate one of non-empty subsets of the plurality of IoT devices;
   select a majority vote input based on the replicated data from the randomly activated subset of the plurality of IoT devices; and
   transmit the majority vote input to a communication destination through a second communication channel, which is different from the first communication channel.

2. The security system according to claim 1, wherein the data includes a sensor data or a control data.

3. The security system according to claim 1, wherein the first communication channel is an out-of-band private data exchange network.

4. The security system according to claim 1, wherein the second communication channel is a public network.

5. The security system according to claim 1, wherein the majority vote input is a median value of the replicated data from the randomly activated subset of the plurality of IoT devices.

6. The security system according to claim 1, wherein a number of the non-empty subsets of the plurality of IoT devices is:

$$2^n-1,$$

where n is a number of the plurality of IoT devices.

7. The security system according to claim 1, wherein a probability that an attacker intercepts one replicated data after random activation is:

$$\frac{2^{n-1}}{2^n-1},$$

wherein n is a number of the plurality of IoT devices.

8. The security system according to claim 1, wherein a false data injection attack is made by an attacker by injecting false data into one of the replicated data by the plurality of IoT devices.

9. The security system according to claim 8, wherein an expectation value of the false data injection attack when selecting the majority vote is:

$$\frac{n+1}{2(2^n-1)}\delta,$$

where n is a number of the plurality of IoT devices and $\delta$ is a magnitude of the false data injection attack.

10. The security system according to claim 1, wherein the communication source or the communication destination is an electric vehicle (EV), an EV charging station, an EV supply equipment, a generator, and a management controller.

11. A security method for enhancing security of a device utilizing a communication channel, the security method comprising:
receiving, by a plurality of Internet of Thing (IoT) devices, data from a communication source through a first communication channel;
replicating, by the plurality of IoT devices, the received data;
randomly activating one of non-empty subsets of the plurality of IoT devices;
selecting a majority vote input based on the replicated data from the randomly activated subset of the plurality of IoT devices; and
transmitting the majority vote input to a communication destination through a second communication channel, which is different from the first communication channel.

12. The security method according to claim 11, wherein the data includes a sensor data and a control data.

13. The security method according to claim 11, wherein the first communication channel is an out-of-band private data exchange network.

14. The security method according to claim 11, wherein the second communication channel is a public network.

15. The security method according to claim 11, wherein the majority vote input is a median value of the replicated data from the randomly activated subset of the plurality of IoT devices.

16. The security method according to claim 11, wherein a number of the non-empty subsets of the plurality of IoT devices is:

$$2^n-1,$$

where n is a number of the plurality of IoT devices.

17. The security method according to claim 11, wherein a probability that an attacker intercepts one replicated data after random activation is:

$$\frac{2^{n-1}}{2^n-1},$$

wherein n is a number of the plurality of IoT devices.

18. The security method according to claim 11, wherein a false data injection attack is made by an attacker by injecting false data into one of the replicated data by the plurality of IoT devices.

19. The security method according to claim 18, wherein an expectation value of the false data injection attack when selecting the majority vote is:

$$\frac{n+1}{2(2^n-1)}\delta,$$

where n is a number of the plurality of IoT devices and $\delta$ is a magnitude of the false data injection attack.

20. A non-transitory computer-readable storage including instruction that, when executed by a processor, cause the processor to perform a security method for enhancing security of a device utilizing a communication channel, the security method comprising:
receiving, by a plurality of Internet of Thing (IoT) devices, data from a communication source through a first communication channel;
replicating, by the plurality of IoT devices, the received data;
randomly activating one of non-empty subsets of the plurality of IoT devices;
selecting a majority vote input based on the replicated data from the randomly activated subset of the plurality of IoT devices; and
transmitting the majority vote input to a communication destination through a second communication channel, which is different from the first communication channel.

* * * * *